United States Patent

Queneau et al.

[11] Patent Number: 5,746,805
[45] Date of Patent: *May 5, 1998

[54] PROCESS FOR THE CONTINUOUS MANUFACTURE OF STEEL

[75] Inventors: Paul E. Queneau, Cornish, N.H.; Martin Hirsch, Friedrichsdorf, Germany

[73] Assignees: Metallgesellschaft Aktiengesellschaft, Frankfurt am Main, Germany; Paul Queneau, Cornish, N.H.

[*] Notice: The term of this patent shall not extend beyond the expiration date of Pat. No. 5,466,278.

[21] Appl. No.: 503,710

[22] Filed: Jul. 18, 1995

[51] Int. Cl.$^6$ .............................. C22B 5/14; C21B 13/14
[52] U.S. Cl. .............................. 75/446; 75/501
[58] Field of Search .............................. 75/446, 501

[56] References Cited

U.S. PATENT DOCUMENTS

| | | | |
|---|---|---|---|
| 3,326,671 | 6/1967 | Worner. | |
| 4,540,432 | 9/1985 | Hirsch et al.. | |
| 5,433,767 | 7/1995 | Bresser et al. | 75/446 |
| 5,466,278 | 11/1995 | Queneau et al. | 75/501 |

FOREIGN PATENT DOCUMENTS 0237811   9/1987   European Pat. Off..

OTHER PUBLICATIONS

"Oxygen Technology and Conservation" Metallurgical Transactions B, vol. 8B, pp. 358–368 (Sep. 1977).
"Direct Steelmaking Project to Benefit American Industry", 33 Metal Producing, pp. 23 and 26, (Jun. 1988).
"The Irsid Continuous Steelmaking Process", A. Berthet et al, Journal of the Iron and Steel Institute, pp. 790–797 (Jun. 1969).
"Smelting Reduction in Iron Baths", Karl Brotzmann, Steel Research 60, No. 3+4, pp. 110–112 (1989).
"Conclusions on the Development of Smelting Reduction", Fine et al, Steel Research 60 No. 3+4, pp. 188–190, (1989).
"Oxygen Steelmaking: Its Control and Future", H.W. Meyer, Journal of the Iron and Steel Institute, pp. 781–789 (Jun. 1969).
"Oxygen Steelmaking in the Future", R.D. Pehlke, Prepared for the International Sumposium for the Year 2000 and Beyond, AIME annual meeting Feb., 1989, Las Vegas, Nevada, pp. 603–611.
"Innovation and the Future of the American Primary Metals Industry" Paul E. Queneau, Journal of Metals, vol. 37, No. 2, pp. 59–64, (Feb. 1985).
"Direct Reduction and Smelting Reduction—an Overview", Rolf Steffen, Steel Research 60 No. 3+4, pp. 96–103 (1989).
"The QSL Reactor for Lead and Its Prospects for Cu, Ni and Fe", Paul E. Queneau, Journal of the Minerals, Metals and Material Society, vol. 41, No. 12, pp. 30–35, Dec. 1989.
"Continuous Steelmaking", M.W. Thring, Steel & Metals International, Jul. 1970, pp. 15–28.
"A New Iron Ore Recovery Process", W.A. Mudge, Metal Process, pp. 108–111 (Mar. 1962).

Primary Examiner—Melvyn Andrews
Attorney, Agent, or Firm—Herbert Dubno

[57] ABSTRACT

Continuous steel making is carried out in an elongated approximately horizontal reactor by providing an iron-rich feed more than half of which is an iron-rich material containing a fine iron ore metallized by more than half of its weight to elemental iron by prereduction. The iron-rich feed and a carbonaceous material are smelted and the melt is covered by a slag layer. By submerged injection a carbonaceous material and a tonnage oxygen gas preferably of at least 95% by volume oxygen is introduced and a gas preferably of at least 95% by volume oxygen is introduced into the smelting zone without penetrating the slag layer. Moderate turbulence is introduced in the reactor bath and the iron layer and slag layer flow countercurrently with the iron flowing into a refining zone and the slag flowing from the refining zone into the smelting zone. Nitrogen-free oxygen is injected into the bath of the refining zone to form steel which can be withdrawn and gaseous products formed in the smelting and refining zones are removed at a discharge end of the smelting zone as an exhaust gas.

43 Claims, 3 Drawing Sheets

PROCESS FOR THE CONTINUOUS MANUFACTURE OF STEEL

CROSS REFERENCE TO RELATED APPLICATION

This application is related to the application Ser. No. 223,833 filed 6 Apr. 1994, now U.S. Pat. No. 5,466,278 issued 14 Nov. 1995.

FIELD OF THE INVENTION

The present invention relates to a flexible tonnage oxygen-based pyrometallurgical process for the production of steel with a carbon content of less than about 1 wt.-%, preferably less than about 0.8 wt.-%, and most preferably less than about 0.5 wt.-%.

BACKGROUND OF THE INVENTION

Steel is an iron-base alloy containing less than about 1% carbon and commonly other alloying elements. Steel is presently manufactured from blast furnace pig iron ("hot metal"), DRI (direct reduced iron) and scrap iron and steel. DRI, also referred to as sponge iron, is produced by solid state direct reduction of iron ore.

The conventional separate unit operations of steelmaking—batch byproduct coke ovens, continuous ironmaking blast furnaces and batch steelmaking furnaces—have dominated the industry for the past one hundred years. Aside from important increases in the size and efficiency of the apparatus employed, there have been only two major changes in this period: the ubiquitous application of tonnage oxygen to enrich or replace process air, and the use of agglomerated, heat indurated, high grade iron mineral concentrates to supplement or replace natural lump iron ore.

In recent years, for increasingly compelling reasons of burdensome capital and operating costs, and because of the need for environmental protection, there has been a sharp increase in continuous ironmaking and steelmaking process research and development. The coal-based COREX continuous ironmaking process operates commercially, but it is dependent on lump iron-rich feed and on a satisfactory market for the large volume of export gas it produces. Currently, the leading infant continuous processes appear to be HIsmelt, DIOS and Romelt, all of which are devoted to ironmaking to overcome the disadvantages of the blast furnace process. These new processes are high intensity, coal-based, in-bath smelting processes treating iron ore fines. Strong efforts devoted to continuous steelmaking appear currently unsuccessful.

The oxygen supplied to HIsmelt is primarily air preheated to 1200° C. Iron ore fines, coal and flux are bottom-injected using nitrogen as carrier gas. A high velocity, high mass flow, hot air blast is injected through a single top tuyere. The bath is highly turbulent, and the metal and slag produced are separated externally. The relatively short, horizontal smelting furnace is round in cross-section and is tiltable through 90°. Its off-gas passes to a circulating fluidized bed to capture entrained droplets and dust. This unit can also function as a close-coupled iron ore pre-reduction system to produce wustite for high intensity bath smelting. The DIOS process comprises a circulating fluidized bed, pre-reduction furnace linked to a smelting furnace similar to a tall L-D oxygen converter. Furnace feed consists of partially reduced fine iron ore, coal, oxygen, and flux. The furnace is bottom-stirred using nitrogen, and operates at 2 atmospheres gauge. The Romelt process employs submerged injection of oxygen-enriched air for smelting of iron ore fines directly introduced with coal into a large volume, violently splashing fluid slag bath. The non-tilting, relatively short rectangular furnace operates under slight negative pressure, and the off-gas leaves the furnace at 1500° to 1800° C. for heat exchange in a waste heat boiler.

OBJECT OF THE INVENTION

It is the object of the present invention to provide a flexible energy efficient, environmentally protective, continuous process for the manufacture of steel which overcomes the disadvantages of the prior art and permits smelting and refining in a single reactor to produce steel. Steady state output of acceptable quality products is an over-riding control, not the specific furnace volume smelting rate.

SUMMARY OF THE INVENTION

The present invention is a economic flexible, tonnage oxygen-based normally coal-based, energy saving, environmentally friendly, pyrometallurgical process for the continuous production of steel with a carbon content of less than about 1 wt.-%, preferably less than about 0.8 wt.-%, and most preferably less than about 0.5 wt.-% from a wide variety of iron bearing materials. The high cost and environmental degradation of the standard coke oven-blast furnace combination are eliminated. The similar debits of the associated fine iron ore particle agglomeration to produce synthetic lump blast furnace feed, e.g., pellet sintering of minus 0.1 mm taconite mineral concentrates, are also eliminated. The process of the present invention includes a smelting of an iron bearing material and a refining of the smelted material in a single, closed, approximately horizontal, elongated reactor.

The iron bearing material can be a direct reduced iron, high grade iron mineral concentrates, iron and steel scrap, iron carbide and mixtures thereof. The process uses a carbonaceous fuel material, preferably, bituminous coal, as a heating and reducing agent. In the process of the invention tonnage oxygen is used as a primary reactant to maximize reaction rates and minimize gas volumes by minimizing their nitrogen content. Continuous solid state preheating and prereduction of the small particle size iron mineral concentrates is preferably carried out in a tonnage oxygen and coal-based circulating fluidized bed system characterized by its high efficiency energy utilization and high ecological compatibility. Such a system is described in the paper "State-of-the-Art Technology for Low Cost Direct Reduction", Iron and Steel Engineer (April 1995). The product—hot, high grade direct reduced iron (DRI) and char—is fed directly and continuously to the steelmaking reactor. With two major exceptions—the absence of an iron ore flash smelting shaft, and the presence of a transition zone, the reactor is generally similar to the type referred to in the Iron and Steelmaker December 1990 editorial "Direct Steelmaking-Quo Modo?".

In the process of the invention, a feed of an iron-rich material containing a fine iron ore which has been more than half by weight metallized to elemental iron by pre-reduction is introduced into a smelting zone of the elongated substantially horizontally oriented reactor. The balance of the iron-rich feed contains one or more iron bearing materials such as iron and steel scrap, fine iron ore and iron carbide. A carbonaceous fuel, and commonly employed flux materials are also introduced into the reactor. A hot liquid layer of iron covered by a liquid layer of slag is formed in the smelting zone. A carbonaceous fuel, preferably solid, and a gas containing preferably at least 80%, more preferably at least 95%, by volume of oxygen, i.e., tonnage oxygen are introduced by submerged injection into the bath in the smelting zone and a gas containing preferably at least 80%, more preferably at least 95%, by volume of oxygen is injected into the smelting zone atmosphere in the reactor above the slag layer without penetrating the slag. Substantially nitrogen-free oxygen gas is supplied by injection into the bath in the refining zone wherein steel is formed. A moderate turbulence is induced in several regions in the reactor.

The process uses a fine particle size coal and iron mineral feed which has heat and mass transfer characteristics far superior to those of the lump coke and lump iron ore of conventional practice. Process temperature and redox potentials are generated by submerged injection of fine particle coal into the reactor bath with tonnage oxygen for smelting purposes, and tonnage oxygen is introduced for refining and post combustion purposes. The reactor and process are designed to effect moderate bath turbulence generated by means of a series of bottom blown fine bubble plumes in a mixer-settler configuration, and on top blowing of oxygen at low or moderate velocity and low or moderate mass flow rates. This is in contrast to prior art based on top and/or bottom blowing of gases, e.g., air, preheated air or oxygen enriched air or oxygen into the bath at high velocities and high mass flow rates for violent bath agitation to achieve high intensity and theoretically high productivity. A key aspect of the present invention is the moderate intensity of the operations in both smelting and refining, so conducted to control bath temperature and to minimize wear of refractories and gas injectors, and thus maximize the continuity of operations. The radiant heat losses of the elongated reactor are off-set by the accompanying important decrease in refractory and down time losses. The onerous direct and indirect maintenance costs of elevated temperature, liquid phase pyrometallurgical reactors commonly outweigh their amortized capital costs. Furthermore the reactor's capital cost is small compared to that of the mandatory associated infrastructure.

The process is carried out in a closed reactor in which the metal and slag flow counter-currently, and the slag and gas preferably flow concurrently. Liquid flow is maintained in an essentially linear,—"plug flow"—mixer/settler configuration, characterized by an alternating series of controlled, submerged injected gas-stirred, moderately turbulent mixing regions and quiescent settling regions. The operations are carried out in two principal zones: a smelting zone into which the iron-containing materials and flux are fed, the oxygen and carbonaceous fuel reductant are injected, and from which the slag is discharged; and a refining zone into which oxygen is injected—also optionally argon, for mild stirring of the bath prior to steel discharge, and fluxes are added, and from which steel is discharged. There is a transition zone between the reduction and oxidation zones which is calm or which can consist of a moderately turbulent melting section into which oxygen, fuel, scrap and iron oxide or carbide can be fed, followed by a quiescent settling section. This zone effectively separates the conditions in the smelting zone from those in the refining zone, thus eliminating any need here for a solid barrier, e.g. partition wall, dam or baffle. Due to the mixer-settler configuration of the bath, no such compartmentation of the long reactor is required elsewhere.

The reactor operations are directed at approach to chemical equilibrium in the bath. Introduction of oxygen, of reductant and of miscellaneous fines and fluxes, are performed in a manner which maximizes gas-liquid-solid contact in the bath while minimizing sloshing and splashing, and controlling temperature turbulence and foaming. The controlled bubble plumes formed in the mixing regions maximize heat and mass transfer, and ensure increase of bath oxygen potential down the length of the reactor toward steel discharge.

Due to the various reactions taking place in the reactor, gaseous reaction products form in the smelting and refining zones. These gaseous products are removed from the reactor through a single exhaust gas system.

The process of the invention is highly advantageous with respect to the many chemical and physical interactions involved. Its horizontal mode operation as compared to vertical mode operation is flexible, eliminates short-circuiting, has favorable capacity/residence time characteristics and slag/metal ratios, and it avoids excessive temperature foaming, splashing, sloshing, and dusting. It has substantial desulfurizing and dephosphorizing capability e.g., by CaO fixation in slag. It is conducive to positive control of oxygen potential, compositional and temperature gradients and of post-combustion phenomena. For important advantages of simplicity and safety, it operates under slightly negative pressure and the closed reactor minimizes fugitive emissions.

Reactor input of iron-bearing materials, fluxes such as CaO, carbonaceous material and oxygen, and reactor output of metal, slag and gas are so controlled as to stage the oxygen potential gradient in the reactor, whereby oxygen potential is lowest at slag discharge and progressively increases to a high at metal discharge. The required oxygen potential gradient can be defined in terms of slag FeO content. The system can include apparatus for collection and use of the reactor off-gas subsequent to post-combustion, e.g., to pre-reduce fine ores, to preheat scrap, and to raise steam for electric power generation.

Exothermic chemical reaction heat is provided in the smelting zone by high velocity, moderate mass flow injection of fine solid carbonaceous materials and oxygen into the bath through submerged tuyeres; and by top introduction of oxygen into the atmosphere above the bath at low or moderate velocity to avoid slag penetration and for post combustion of carbon monoxide-containing gases. Combustion of the injected fuel with oxygen generates hot, CO-rich gas in the bath for smelting purposes. Heat is provided in the refining zone by essentially nitrogen-free oxygen, introduced into the bath by bottom injection at high velocity and moderate mass flow for oxidation of carbon and removal of impurities in the bath, and also by a moderate velocity and moderate mass flow top injection of essentially nitrogen free oxygen for slag penetration and oxidation, and for post combustion purposes.

BRIEF DESCRIPTION OF THE DRAWING

The above and other objects, features, and advantages will become more readily apparent from the following description, reference being made to the accompanying drawing in which: For a better understanding of the invention, its operating advantages and specific objectives attained by its use, reference should be had to the accompanying drawing and descriptive matter in which there is illustrated and described preferred embodiments of the invention.

IN THE DRAWINGS

SPECIFIC DESCRIPTION

The present invention is a continuous, tonnage oxygen based pyrometallurgical process for the direct production of steel. An outstanding aspect of the process is its flexibility in that it provides for steel production from a wide variety of iron-bearing materials, such as direct reduced iron (DRI), high grade iron mineral concentrates, scrap iron and steel and iron carbide, using carbonaceous fuels, e.g., bituminous coal—as heating and reducing agents in a single reactor.

In the process of the invention tonnage oxygen is used as a primary reactant in the reactor. The introduction of oxygen into the reactor is distributed between submerged and top blowing injectors. The use of oxygen as described below maximizes reaction rates and minimizes gas volumes because the process and system are not burdened by the large amounts of nitrogen commonly accepted in pyrometallurgical processes.

The process of producing steel from a variety of iron bearing material involves two basic steps: smelting and refining. In the invention, these operations are conducted in a single closed elongated reactor. One of several important advantages of performing both steps in this reactor is that it eliminates the need for intermediate transfer operations and the many associated problems and costs. The reactor is advantageously operated under a slight negative pressure.

The process is carried out in a reactor which is preferably gently sloped approximately 1% downward toward the steel discharge end, with a length to width ratio of greater than about 5:1, preferably at least about 7:1, but not greater than about 10:1. The reactor is refractory lined, can be round in cross-section and tiltable through 90° (clockwise and preferably also counterclockwise), or it can be rectangular in outside cross-section and non-tiltable with submerged side-mounted, downwardly sloped injectors. The reactor can be for example about 5 m in width and about 40 m long, and can produce at least 1200 t/d of steel containing 0.75% C or less.

In a preferred embodiment the smelting and refining operations are separated by a transition zone which is calm or may consist of a modestly turbulent section followed by a quiescent settling section and may constitute approximately 20% of the total reactor length. Oxygen, carbonaceous fuel, scrap and/or iron carbide may optionally be introduced into the reactor in the transition zone. In comparison to the smelting and refining zones, there is limited chemical reaction occurring in the transition zone, except when oxygen, coal and/or $Fe_3C$ are introduced. The transition zone, which operates under intermediate temperature and compositional conditions, acts as a liquid barrier effectively separating the conditions in the smelting zone where reduction is occurring from those in the refining zone where oxidation proceeds. Thus the transition zone eliminates the need here for a solid barrier which interferes with free flow of metal and slag and is costly to maintain.

In the process of the invention, an iron bearing material, carbonaceous fuel and flux can be introduced together or separately into the smelting zone of the reactor. The iron bearing material is an iron-rich material containing a fine iron ore which has been pre-reduced such that more than half by weight is elemental iron. Pre-reduced ore feed can be supplied from a wholly external remote source. The balance of the iron-rich feed can contain other iron based materials such as iron and steel scrap, fine iron ore and iron carbide. The iron-rich feed to the reactor preferably contains iron ore which has been more than half by weight metallized to Fe° by pre-reduction and more preferably more than 80% so metallized from an associated DRI furnace. The balance of the iron-rich feed optimally contains less than 50% by weight fine iron ore, less than 50% by weight iron and steel scrap and less than 50% by weight of other iron rich materials such as iron carbide. The common flux materials, e.g., dolomite, which is calcium-rich and contains magnesium, and fluorspar are used. The metal-rich or FeO-rich pre-reduced reactor feed enters the central section of the reactor and scrap may be fed into the transition zone between the smelting and refining zones, also optionally into the smelting and refining zones. Iron carbide may be substituted for all or part of the scrap introduced into the transition zone, depending on scrap quality and cost. Sprinkler burners can be employed for top injection of fine iron ore materials with coal and oxygen as disclosed in U.S. Pat. No. 4,326,702.

The tonnage oxygen preferably contains at least about 80 vol.-% $O_2$. That is to say that the gas contains at least about 4 volumes of oxygen to 1 volume of nitrogen in contrast to the reverse content in air. The carbonaceous fuel is preferably a medium to high volatile bituminous coal, but other classes of coal, including lignite, are suitable for use in the process of the invention. Other carbonaceous fuels, such as char, coke, oil and gas can be used, and also can be used in varying amounts as a mixture. Char, when used, is preferably at least 50 wt.-% carbonaceous fuel components. Preferably the solid fuel has a particle size of less than about 0.1 mm. The coal usually contains a small amount of sulfur, most of which can be fixed in the slag. The iron ore may contain in a small amount phosphorus, most of which can also be fixed in the slag.

In the process of the invention, a bath is formed in the reactor. The bath contains molten iron—i.e., "hot metal"—covered by a liquid slag layer. The molten metal is formed in the smelting zone which operates at a temperature of from more than about 1200° C. to less than about 1500° C. The operating temperature of the refining zone is more than about 1500° C. to less than about 1700° C. To provide proper conditions for the gas-slag-metal reactions, the slag to metal depth ratio in the smelting zone is preferably maintained at more than 1:1, based on quiescent slag and metal. Sufficient metal depth is maintained in the reactor to ensure adequate temperature and compositional "sinks" along its length. The bath depth may be about 1.5 meters and much of it is a mixture of slag and metal.

Most of the iron content—as metal droplets or iron oxide—in the slag produced in the reactor's steelmaking zone is recovered in its passage through the smelting zone, a benefit over conventional steelmaking practice. The steady state character of these continuous operations and their nature makes instrumentation control of chemical and physical conditions in the reactor much easier than in conventional steelmaking. In batch operations, conditions vary rapidly and cyclically, in continuous operations these changes are avoided. The absence of extreme bath agitation in horizontal mode continuous iron and steelmaking of the invention contrasts advantageously with its presence in relatively small essentially vertical mode reactors of the prior art.

Published conventional wisdom in pyrometallurgy theory over-emphasizes the importance of maximizing bath smelting intensity, i.e., as measured in terms of rate of production per unit volume of reactor. However, that approach to continuous steelmaking is presently unrealistic. Economic steady state output of acceptable quality products is the over-riding control and requires a process and reactor which operate continuously and satisfactorily for months without frequent or lengthy shut downs. For these reasons, the present invention employs a moderate, rather than high, process intensity with moderate, rather than violent, bath agitation. The conventional wisdom has also indicated that continuous steelmaking in a single reactor is not possible because lateral mixing is inevitable and fatal. Accordingly series countercurrent flow of slag and metal in at least two well stirred vessels has been deemed essential. The present contrariwise invention relies on a single long horizontal reactor utilizing an effective mixer-settler bath configuration.

Oxygen and fuel enter the reactor by submerged injection, preferably through Savard-Lee type tuyeres at high velocities, e.g., sonic but at moderate mass flow rates. Refractory life around the submerged injectors can be extended by externally water-cooled, monolithically-refractory enclosed, massive copper inserts. Refractories above the bath can be protected by an array of suspended boiler tubes generating by-product steam, and refractories can also be protected by water jackets. Oxygen is also supplied through top injection into the atmosphere of the reactor above the slag layer. This gas is available for bath reactions and for post-combustion of CO containing gas.

In the process of the invention, counter-current metal-slag flow is established in the reactor. The iron flows counter-currently from the smelting zone through the transition zone into the refining zone of the reactor, and the slag flows from the refining zone through the transition zone into the smelting zone. Substantially nitrogen-free oxygen gas is supplied to oxidize carbon in the refining zone. Preferably, the gas contains at least about 98% oxygen and less than about 0.1% nitrogen.

Liquid steel is formed in, and withdrawn from the end of the refining zone. The discharged steel may be further refined or alloyed by well known ladle metallurgy or other refining techniques. Slag is removed from the reactor at the opposite end of the reactor in the smelting zone.

In the process of the invention, a bath oxygen potential gradient is maintained over most of the reactor, and preferably over substantially the entire length of the reactor. Bath oxygen potential is a function of the FeO content of the slag. A higher slag FeO content results in a higher bath oxygen potential. The oxygen potential is highest in the refining zone in the area of steel discharge, is lowest in the smelting zone in the area of slag discharge and is at an intermediate value in the transition zone. The oxygen potential gradient in the smelting zone can be established by varying the ratio of the oxygen to carbonaceous material introduced into the bath along its length. The oxygen potential gradient in the refining zone can be established by varying the rate of oxygen injection along its length. For instance, to produce steel with a carbon content of about 0.5 wt.-% or less, the slag in the area of steel discharge should contain more than about 5% FeO and the slag exiting the smelting zone should contain less than about 2% FeO, to maximize reactor iron recovery. Consistent with the need to maintain an oxygen potential gradient from relatively low at reactor slag exit to relatively high at steel exit, iron carbide may be introduced by submerged injection into the smelting zone towards the slag discharge end, e.g., mixed with reactor off-gas dust or minus 10 micron iron ore fines which have been removed from reactor feed.

Gaseous reaction products formed in the smelting and the refining zones are discharged from the reactor smelting zone as exhaust gases. The reactor off-gas contains CO and $H_2$ which can be used in various ways, e.g., in all or in part to pre-reduce fine ores, to preheat scrap, and to produce steam for electric power generation. The pre-reduction operation can include producing additional reducing gas by partial combustion of carbonaceous material with oxygen. The reactor exhaust gas can be treated to remove at least a portion of its $CO_2$ and $H_2O$ content. Dust in the exhaust gas can be removed and reintroduced into the smelting zone with or without agglomeration, in the former case using well known agglomerating techniques. The dust may be mixed with fine iron ore and optimally agglomerated and reintroduced into the smelting zone.

It has been found that inducing only a moderate turbulence in the reactor bath is beneficial to the process in contrast to prior art practices based on top-blowing and/or bottom blowing of gases into their baths at high velocities and high mass flow rates to violently agitate the bath. Accordingly, only a moderate turbulence is induced in the bath at separate positions along the reactor length, primarily by the use of the submerged injectors. In a preferred embodiment, moderate turbulence is induced repeatedly along the length of the reactor and in each instance the region of turbulence in the bath is followed by a quiescent zone. The turbulent and quiescent zones are thus in the form of a mixer-settler configuration. The mixing is effected by controlled fine bubble plumes produced by submerged injection of high velocity moderate mass flow gases. The injection velocities and mass flow rates are determined in part by the densities and viscosities of the metal and slag, and must be sufficient to avoid plugging of the injectors. However, the gases injected should not be so energetic as to cause significant levitation of bath content as particulates into the reactor atmosphere above the slag.

In a preferred embodiment of the invention, more than half by weight of the iron-rich reactor feed is a fine iron ore which has been pre-reduced in a fluidized bed system using coal and tonnage oxygen to yield a product which is more than half by weight metallized. Metallization here refers to the amount of elemental iron ($Fe^°$) in the product compared to the total iron content of the fine iron ore.

In a more preferred embodiment of the invention, an iron oxide containing material and solid carbonaceous reducing agent are charged into a fluidized bed system which incorporates an expanded fluidized bed reactor. The fluidized bed may be operated at slightly above atmospheric pressure or at higher pressures, i.e., several bars above atmospheric pressure and the solids are recycled to the fluidized bed reactor at a rate such that the solids circulation per hour within the circulatory fluidized bed is at least about five times the weight of solids present in the fluidized bed reactor.

The term "expanded fluidized bed" is used to describe highly expanded fluidized beds which are operated above the lowest velocity at which the solid particles are maintained in suspension (terminal velocity of a falling particle). A suitable system is described in U.S. Pat. No. 4,806,158, the disclosure of which is incorporated herein by reference.

In another preferred embodiment, the fluidized bed system incorporates more than one fluidized bed and at least one of the fluidized beds is a circulating fluidized bed. Such a system may incorporate a "stationary" or bubbling fluidized bed as the other reactor of the fluidized bed system. The fluidized bed system may incorporate two or more circulating fluidized beds which can be used in combination with the stationary or bubbling type fluidized beds or even a third circulating fluidized bed.

In a preferred embodiment, the gas-solids suspension discharged from the first expanded fluidized bed is supplied to a second expanded fluidized bed and a strongly reducing gas is supplied as a fluidizing gas into the second fluidized bed. The strongly reducing gas and a major portion of the resulting devolatilized carbonaceous material are discharged from the upper portion of the second fluidized bed. Further, the devolatilized carbonaceous material is separated from the gas and recycled to the first fluidized bed. A portion of the gas from the second fluidized bed is purified, treated to remove $CO_2$, and is then recycled to the second fluidized bed as fluidizing gas. Reduced material that has been subjected to a metallization of 50 to 80% and the remainder of the devolatilized carbonaceous material are discharged from the lower portion of the second fluidized bed.

In a more preferred embodiment the iron bearing material is at least 85% metallized. In another embodiment the fluidized bed system may be used to produce $Fe_3C$.

Figure 1:
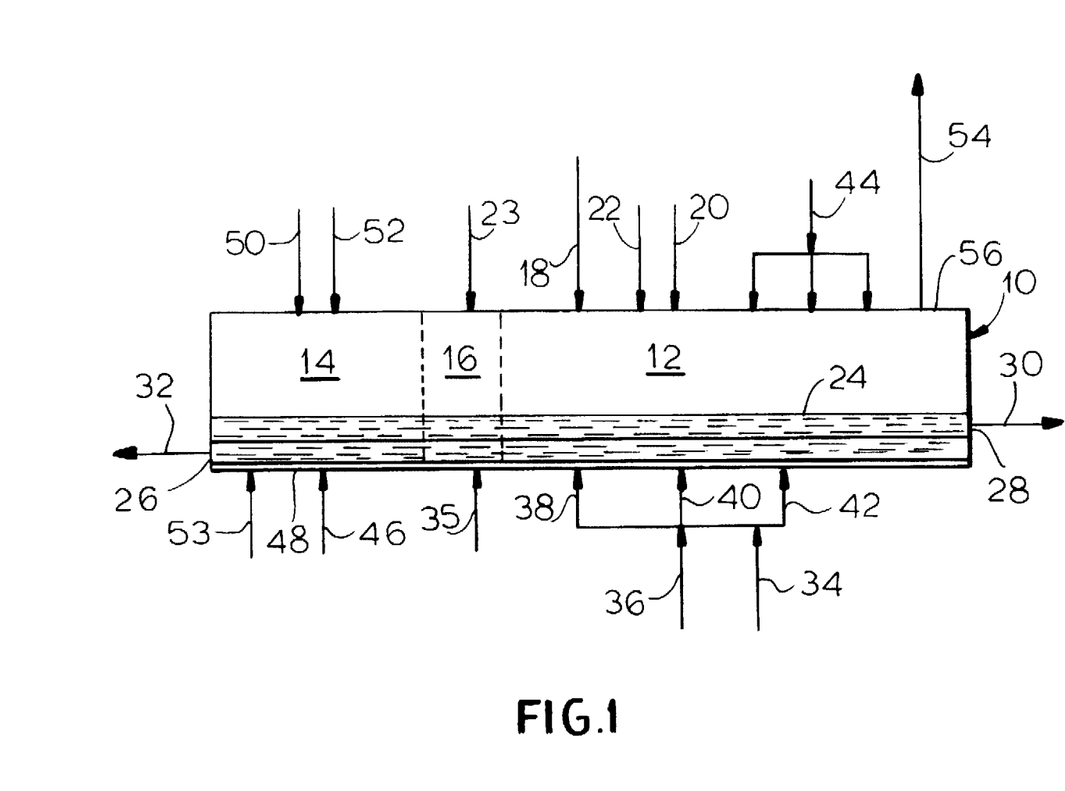
FIG. 1 is a diagrammatic longitudinal section which generally shows a process and apparatus for practicing the invention.

Referring to FIG. 1, an elongated substantially horizontal reactor 10 is generally indicated. The reactor which is internally lined with a refractory material such as an MgO based ceramic lining, is formed with a smelting zone 12 and a refining zone 14. The smelting and refining zones 12 and 14 are separated by a transition zone 16.

An iron-rich feed 18, comprising pre-reduced iron ore, iron ore, iron oxide, scrap and optionally iron carbide, wherein the pre-reduced iron ore contains char and flux (CaO), a carbonaceous fuel 20 and a flux 22 are introduced into reactor 10. A bath 24 formed of molten metal 26 covered by a layer of fluid slag 28 is formed in reactor 10. In the reactor, slag flows from the refining zone 14 section into the smelting zone 12 section and is removed from the reactor 10 at, or near, end 30. Refined metal is discharged from the reactor 10 at or near the end 32 of the refining zone 14 and optionally is then further refined.

As shown schematically, coal 34 and tonnage oxygen 36 are mixed and controlled in various proportions and are injected into the bath by submerged injectors 38, 40 and 42 in the smelting section of the reactor 10. The injectors are cooled by shrouding gas. The tonnage oxygen gas introduced at 38, 40 and 42 contains about 80% by volume of oxygen. A similar oxygen containing gas 44 is introduced into the atmosphere of the reactor 10 in the smelting zone. The gas 44 can be blown in so as to contact the slag 28 but should not penetrate or substantially indent the slag layer 28.

Optionally, iron and steel scrap 23 may be introduced into the transition zone 16. Also, coal and oxygen 35 can also be introduced into the transition zone 16.

In refining zone 14, substantially nitrogen free oxygen 46 is introduced into reactor 10 by means of submerged injectors 48 and is also top blown into the reactor as at 50, and 52. Flux material is also introduced. A mildly stirring purge gas, i.e., argon, can also be injected at 53.

Liquid reaction products formed in the reactor remain in the bath and others, which are gaseous, can escape the bath. The gaseous components 54, including gaseous reaction products, such as products of combustion, including $CO_2$ and $H_2O$, along with combustible components CO and $H_2$ and particulate matter, are exhausted from the reactor smelting zone through exhaust port 56 which is at the discharge end of the smelting zone.

Figure 2:
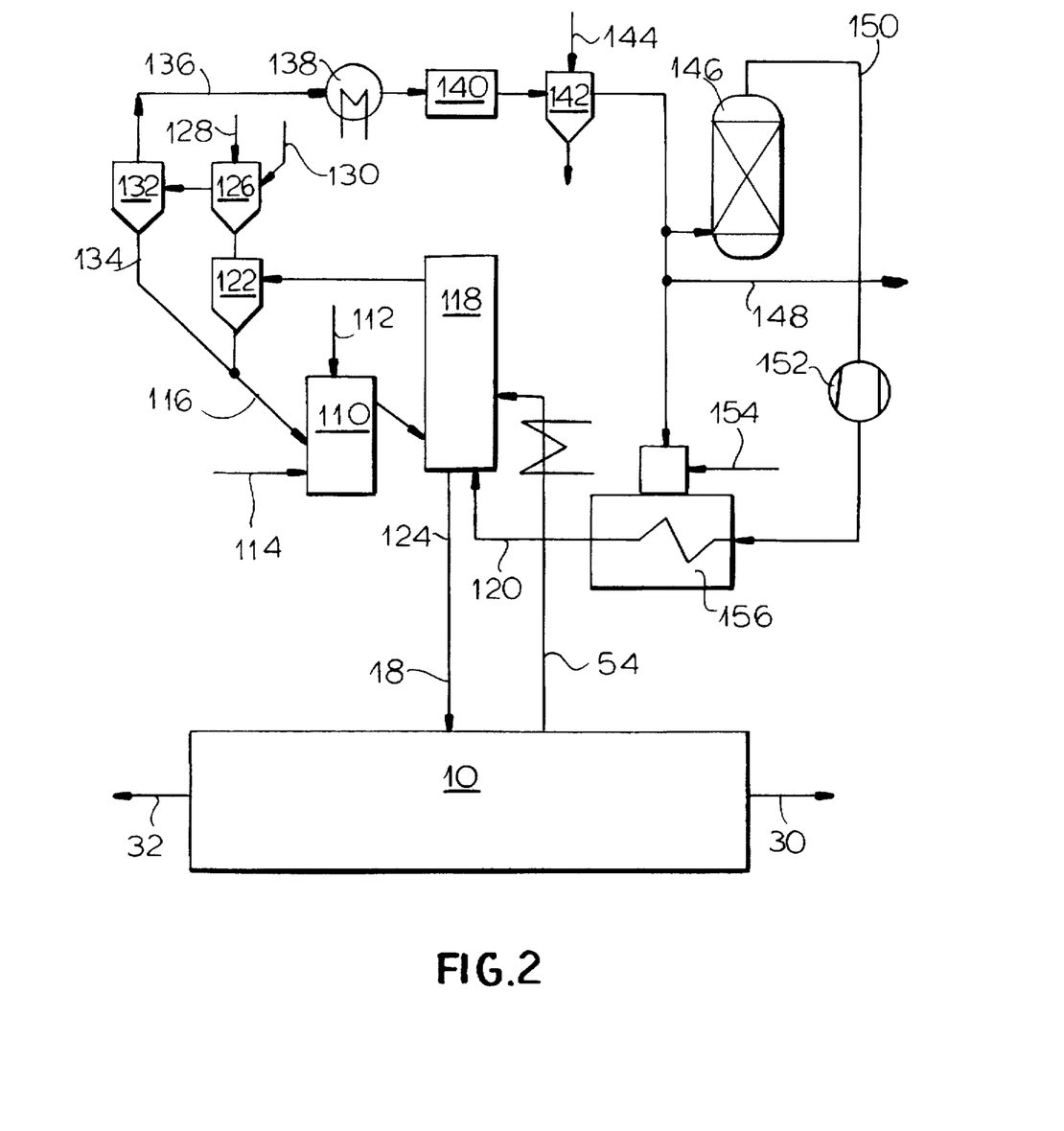
FIG. 2 is a flow diagram which generally depicts an arrangement employing the process utilizing a fluidized bed system to supply at least a part of the iron-rich feed.
Figure 3:
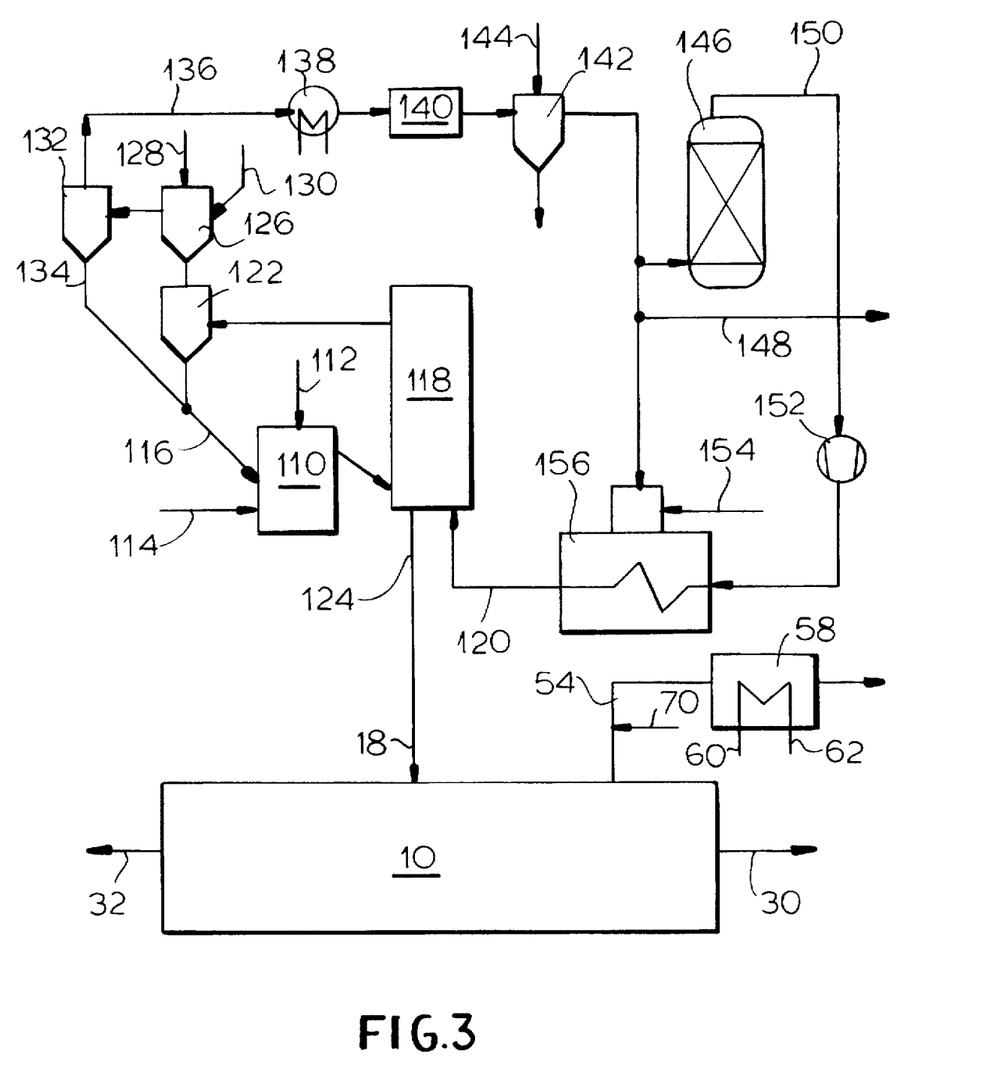
FIG. 3 is another flow diagram which shows an alternate embodiment of the arrangement of FIG. 2.

Referring to FIGS. 2 and 3, the fine-iron ore with a mean particle size of <0.1 mm is agglomerated prior to introduction into the smelting zone 12. The dust separated from the exhaust gas of the reactor 10 is mixed with the iron ore of a fine particle size, then agglomerated and introduced into the smelting zone 12. This mode of operation permits an advantageous recycling of waste products and the use of very fine-particle size materials. It can also be advantageous in accordance with the invention to supply iron ore as a coolant and/or oxidizer to the refining zone 14 or transition zone 16. In addition to the iron ore, the slag forming agents introduced in the refining zone 14 or transition zone 16 also serve as coolants. Scrap steel and iron can also be introduced into the reactor 10 in the smelting or refining zones 16 where the scrap is melted.

Referring to FIG. 2, a preheating vessel 110 is charged with coal 112, oxygen 114 and an ore stream 116 containing fine iron ore material. The ore contains $Fe_2O_3$ or $Fe_3O_4$ or mixtures thereof. The heated iron ore containing material and coal are introduced into a reduction furnace system 118 which is a fluidized bed system including a circulating fluidized bed reactor. In those embodiments where the fluidized bed system includes more than one fluidized bed reactor, the various solids and gas phase streams will be separately directed for further processing as described, for instance, in U.S. Pat. No. 4,806,158 which shows a fluidized bed system utilizing two expanded fluidized beds.

Fluidizing gas 120 is introduced at or near the bottom of the fluidizing bed reactor 118. Exhaust gas 54 is introduced into reactor 118 above fluidizing gas 120. A gas-solids suspension is formed in reactor 118 and the entrained solids are separated in a recycle cyclone 122. Reduced iron ore, which is at least 50% metallized, is withdrawn from reactor 118 near its bottom through discharge line 124 which feeds into line 18 through which the iron-rich feed is introduced into reactor 10.

Recycle cyclone 122 is vented to a suspension heater 126. In suspension heater 126 the cyclone exhaust gas stream with any remaining entrained dust particles mixes with raw iron ore 128 and recycled char 130. Suspension heater 126 vents to a second cyclone 132 and the heated particulates are discharged from cyclone 132 through line 134 which feeds into line 116 as does the solids discharge line from recycle cyclone 122. The off-gas 136 from cyclone 132 is cooled in a waste heat boiler 138 which generates steam and the cooled gas is introduced into an electrostatic precipitator or bag house 140 for removal of remaining fine particulate. The dust filter exhaust can then be cooled in a spray cooler 142 with water 144 and then at least a portion passed on for further conditioning such as to a $CO_2$ absorber. The gas 150 exiting the absorber 146 is pressurized in compressor 152, and heated in a gas preheater 156 which raises the temperature to about 750° C. The gas preheater 156 is heated by the combustion of the remainder of gas stream from 142 and air 154 and then directed to the fluidized bed reactor as fluidizing gas 120.

FIG. 3 shows a system wherein the reactor 10 is not linked to reactor 118 in that the exhaust gas stream of reactor 10 is not directly introduced into reactor 118. FIG. 3 essentially shows the system of FIG. 1 but includes the fluidized bed system and feed preparation steps of FIG. 2. In this embodiment, the exhaust gas 54 is treated by combustion with air 70 and is passed through heat exchanger 58 wherein a boiler feed water 60, is converted to steam 62. Such energy recovery devices are well known.

EXAMPLES

Example 1

Referring to FIGS. 1 and 2: An iron rich feed 18 is introduced into reactor 10. The iron rich feed is made up as follows: 45.7 th of pre-reduced iron ore (DRI) which consists of 85.7 wt.-% Fe° (elemental iron), 9.1 wt.-% FeO, 5.0 wt.-% $SiO_2$, 0.1 wt.-% $Al_2O_3$ and 0.6 wt.-% CaO,;

8.7 th of scrap which consists of 99.5 wt.-% Fe and 0.5 wt.-% C;

9.4 th of char, and 2.0 th of flux (CaO).

3.0 th of coal are introduced through line 34, and 2800 $Nm^3/h$ of $O_2$ are introduced through line 36 into the reactor 10 by submerged injection, 6700 $Nm^3/h$ of $O_2$ are top blown into the smelting zone 12 of reactor 10 through line 44 and 0.2 t/h of CaO are introduced through line 22 into the reactor 10.

700 $Nm^3/h$ of $O_2$ are introduced in the refining zone atmosphere through lines 50 and 52 and 200 $Nm^3/h$ of $O_2$ are introduced by submerged injection through line 48 into the reactor 10.

The operating-temperature in the reactor 10 is adjusted to about 1450° C. in the smelting zone 12 and about 1620° C. in the refining zone 14.

5.3 t/h slag are discharged from the smelting zone area through line 30 and 50.0 t/h steel containing 0.5 wt.-% C are discharged through line 32 from the reactor 10.

An exhaust gas in the volume of 22,000 $Nm^3/h$ and consisting of 90.0 vol.-% CO, 4.5 vol.-% $CO_2$, 3.9 vol.-% $H_2$, 0.1 vol.-% $H_2O$ and 2.0 vol.-% $N_2$ is discharged from the reactor 10 through line 54 and is introduced into the circulating fluidized bed reactor of the reduction furnace system 118 above the fluidizing gas 120. 60.7 t/h of iron ore, 23.2 t/h of coal, and 6200 $Nm^3/h$ of $O_2$ are introduced into the heating reactor 110 respectively through lines 116, 112 and 114. The heated material is introduced into the circulating fluidized bed reactor of the reduction furnace system 118.

Example 2

Referring to FIGS. 1 and 3:

31.2 t/h of pre-reduced iron ore (DRI) consisting of 69.2 wt.-% $Fe_{met}$ (metallic iron), 24.6 wt.-% FeO, 4.8 wt.-% $SiO_2$, 0.8 wt.-% $Al_2O_3$ and 0.6 wt.-% CaO, 8.5 t/h of iron ore consisting of 96.8 wt.-% $Fe_3O_4$, 2.3 wt.-% $SiO_2$ and 0.9 wt.-% of ($CaO+MgO+Al_2O_3$), 11.4 t/h of scrap consisting of 99.5 wt.-% Fe and 0.5 wt.-% C, 5.7 t/h of $Fe_3C$ consisting of 92.0 wt.-% $Fe_3C$, 5.0 wt.-% FeO and 3.0 wt.-% inert material (2.4 wt.-% $SiO_2$ and 0.6 wt.-% $CaO+Al_2O_3$), 3.0 t/h of char, and 1.8 t/h of flux (CaO) are introduced through line 18 into the reactor 10.

4.8 t/h of coal are introduced through line 34, and 1930 $Nm^3/h$ of $O_2$ are introduced through line 36 into the reactor 10 by submerged injection.

5000 $Nm^3/h$ of $O_2$ are introduced by top blowing through line 44 and 0.2 t/h of CaO are introduced through line 22 into the reactor 10, 700 $Nm^3/h$ of $O_2$ were introduced through lines 50 and 52 and 270 $Nm^3/h$ of $O_2$ were introduced through line 48 by submerged injection into the reactor 10.

The operating-temperature in the reactor 10 is adjusted to about 1450° C. in the smelting zone 12 and 1620° C. in the refining zone 14.

50 t/h of steel containing 0.5 wt.-% C are discharged through line 32 from the reactor 10 and 4.6 t/h of slag are discharged through line 30.

15,740 $Nm^3/h$ of exhaust gas consisting of 40.3 vol.-% CO, 40.3 vol.-% $CO_2$, 4.4 vol. % $H_2$, 13.0 vol.-% $H_2O$ and 2.0 vol.-% $N_2$ are discharged through line 54 from the reactor 10.

Into heating reactor 110 42.3 t/h of iron ore are introduced through line 116, 14 t/h of coal are introduced through line 112, and 5500 $Nm^3/h$ $O_2$ are introduced through line 114. The heated material is then introduced into the circulating fluidized bed reactor of the reduction furnace system 118.

Example 3

Referring to FIGS. 1 and 3:

31.2 t/h of pre-reduced iron ore (DRI) consisting of 69.2 wt.-% $Fe_{met}$ (metallic iron), 24.6 wt.-% FeO, 4.8 wt.-% $SiO_2$, 0.8 wt.-% $Al_2O_3$ and 0.6 wt.-% CaO, 8.5 t/h of iron ore consisting of 96.8 wt.-% $Fe_3O_4$, 2.3 wt.-% $SiO_2$ and 0.9 wt.-% of ($CaO+MgO+Al_2O_3$), 18.1 t/h of scrap consisting of 99.5 wt.-% Fe and 0.5 wt.-% C, 3.0 t/h of char, and 1.8 t/h of flux (CaO) are introduced through line 18 into the reactor 10.

5.0 t/h of coal are introduced through line 34, and 1730 $Nm^3/h$ of $O_2$ are introduced through line 36 into the reactor 10 by submerged injection.

5000 $Nm^3/h$ of $O_2$ are introduced by top blowing through line 44 and 0.2 t/h of CaO are introduced through line 22 into the reactor 10, 700 $Nm^3/h$ of $O_2$ were introduced through lines 50 and 52 and 270 $Nm^3/h$ of $O_2$ were introduced through line 48 by submerged injection into the reactor 10.

The operating-temperature in the reactor 10 is adjusted to about 1450° C. in the smelting zone 12 and 1620° C. in the refining zone 14.

50 t/h of steel containing 0.5 wt.-% C are discharged through line 32 from the reactor 10 and 4.6 t/h of slag are discharged through line 30.

16,060 $Nm^3/h$ of exhaust gas consisting of 40.5 vol.-% CO, 40.5 vol.-% $Co_2$, 4.2 vol. % $H_2$, 12.8 vol.-% $H_2O$ and 2.0 vol.-% $N_2$ are discharged through line 54 from the reactor 10. The exhaust gas is purified, treated to remove $CO_2$, is then recycled to the second fluidized bed as fluidizing gas. The gas flow is 7820 $Nm^3/h$ with 83.2% CO; 8.8% $H_2$; 4.1% $N_2$; 1% $CO_2$; 3% $H_2O$.

Into heating reactor 110 42.3 t/h of iron ore are introduced through line 116, 14 t/h of coal are introduced through line 112, and 5500 $Nm^3/h$ $O_2$ are introduced through line 114. The heated material is then introduced into the circulating fluidized bed reactor of the reduction furnace system 118.

It will be understood that the specification and examples are illustrative but not limitative of the present invention and that other embodiments within the spirit and scope of the invention will suggest themselves to those skilled in the art.

What is claimed is:

1. A process for continuous steel making in an elongated approximately horizontal reactor with a carbonaceous material and a flux comprising:

(a) providing an iron-rich feed more than half by weight of which is an iron rich material containing a fine iron ore which has been more than half by weight metallized to elemental iron by pre-reduction;

(b) introducing the iron-rich feed and carbonaceous material into a smelting zone of the elongated approximately horizontal reactor;

(c) continuously forming in the smelting zone a liquid bath of hot metal covered by a layer of slag;

(d) introducing by submerged injection into the bath in the smelting zone a carbonaceous material and a tonnage oxygen gas containing at least 80%, by volume of oxygen;

(e) introducing a gas containing at least 80% by volume of oxygen into the smelting zone atmosphere without penetrating the slag layer;

(f) causing a moderate turbulence in the reactor bath and flowing the iron layer and the slag layer counter currently so that the iron flows from the smelting zone into a refining zone of the reactor and the slag flows from the refining one into the smelting zone;

(g) withdrawing the slag from the smelting zone;

(h) supplying substantially nitrogen-free oxygen gas by injection into the bath in the refining zone whereby steel is formed;

(i) withdrawing the steel from the refining zone; and (j) removing gaseous products formed in the smelting and refining zones from a slag discharge end of the smelting zone as an exhaust gas.

2. The process of claim 1 wherein a balance of the iron-rich feed beyond said iron-rich material contains at least one material selected from the group consisting of iron and steel scrap, fine iron ore and iron carbide.

3. The process of claim 1 wherein solid carbonaceous material is introduced by submerged injection into the smelting zone.

4. The process of claim 1 wherein at least a part of the iron-rich material is obtained by charging a fine iron ore into a fluidized bed reactor of a circulating fluidized bed system wherein the iron ore is pre-reduced.

5. The process of claim 4 wherein a reducing material in the form of fine coal is introduced into said system with an oxygen containing combusting gas containing at least 80% by volume of oxygen.

6. The process of claim 1 wherein the reactor has an oxygen potential gradient over its length which is staged so that an oxygen potential in said reactor is lowest at withdrawal of slag from the smelting zone and highest at steel withdrawal from the refining zone.

7. The process of claim 6 wherein the oxygen potential gradient is obtained by means of a mixer-settler configuration over the length of the bath.

8. The process of claim 7 wherein the smelting zone is separated from the refining zone by a transition zone of intermediate temperature and oxygen potential.

9. The process of claim 8 wherein scrap is melted in the transition zone.

10. The process of claim 1 wherein the reactor is sloped downward approximately 1% toward a steel discharge end and has a length to width ratio of at least about 5:1.

11. The process of claim 1 wherein more than half of the iron-rich material fed into the reactor is a fine iron ore which is at least about 80% by weight, metallized to elemental iron.

12. The process of claim 4, further comprising: charging the iron ore into the fluidized bed reactor of a first reduction stage; introducing a hot reduction gas into the fluidized bed reactor as fluidizing gas; fluidizing the iron ore to form a gas-solid suspension; pre-reducing the iron ore; discharging the suspension from the fluidized bed reactor; substantially removing the solids in a separating means; and returning the separated solids into the fluidized bed reactor.

13. The process of claim 12 wherein the fluidized bed reactor is an expanded fluidized bed of said circulating fluidized bed system, and the separated solids are returned into the fluidized bed reactor such that the solids circulation per hour within the circulating fluidized bed system is at least about five times the weight of solids present in the fluidized bed reactor.

14. The process of claim 1 wherein the carbonaceous material is a coal.

15. The process of claim 1 wherein the carbonaceous material contains at least about 50% by weight of char.

16. The process of claim 1 wherein the iron-rich feed contains at least two of direct reduced iron, high grade iron mineral concentrates, iron and steel scrap and iron carbide.

17. The process of claim 11 wherein the exhaust gas of the steelmaking reactor is introduced into the fluidized bed reactor as a secondary reducing gas.

18. The process of claim 12 wherein the exhaust gas from the reactor contains $CO_2$ and $H_2O$ more than half of which is separated from the exhaust gas and the remainder of the exhaust gas is introduced into the fluidized bed reactor.

19. The process of claim 1 wherein the iron-rich feed fed into the reactor contains less than 50 wt.-% fine iron ore, less than 50 wt.-% iron and steel scrap and less than 50 wt.-% iron carbide.

20. The process of claim 1 wherein the operating temperature in the smelting zone is more than about 1200° C. and less than about 1500° C. and the operating temperature in the refining zone is more than about 1500° C. and less than about 1700° C.

21. The process of claim 1 wherein substantially all of the iron ore has a particle size below about 0.1 mm.

22. The process of claim 12 wherein the iron ore is in the form of a concentrate and substantially all of the concentrate has a particle size below about 0.1 mm.

23. The process of claim 12 wherein substantially all of the iron ore introduced into the fluidized bed reactor has a particle size below 5 mm preferably not greater than 2 mm.

24. The process of claim 1 wherein substantially all of the carbonaceous material in solid form has a particle size below about 0.1 mm.

25. The process of claim 1 wherein the iron-rich material with a particle size of <0.1 mm is subjected to moist agglomeration prior to being introduced into the smelting zone.

26. The process of claim 1 wherein the exhaust gas from the reactor contains dust which is separated from the exhaust gas and reintroduced into the smelting zone.

27. The process of claim 26 wherein the separated dust is subjected to moist-agglomeration and reintroduced into the bath in the smelting zone.

28. The process of claim 26 wherein the dust is mixed with the fine iron ore and reintroduced into the smelting zone.

29. The process of claim 28 wherein the dust is mixed with the fine iron ore, subjected to moist-agglomeration and reintroduced into the smelting zone.

30. The process of claim 1 wherein the withdrawn steel is treated by ladle refining.

31. The process of claim 1 wherein iron ore is introduced into the refining zone.

32. The process of claim 10 wherein the reactor has a round cross section and is tiltable through 90°.

33. The process of claim 10 wherein the reactor is non-tiltable and has a rectangular cross section.

34. The process of claim 2 wherein at least a portion of the exhaust gas from the reactor is used for preheating scrap.

35. The process of claim 4 at least some CO in the exhaust gas from the reactor is recycled to the fluidized bed system as a secondary reducing gas.

36. The process of claim 35 wherein the exhaust gas is combusted and used for steam generation.

37. The process of claim 1 wherein the carbon content of the steel is less than about 0.75 wt % and preferably less than about 0.5 wt. %.

38. The process of claim 1 wherein the reactor is operated under a slight negative pressure.

39. The process of claim 1 wherein the reactor is operated as an internal-baffle-free, dam-free and partition-wall-free reactor.

40. The process of claim 1 wherein the carbonaceous material is coal which contains sulfur more than 50% by weight of which is fixed in the slag.

41. The process of claim 1 wherein the iron ore contains phosphorus more than 50% by weight of which is fixed in the slag.

42. The process of claim 1 wherein substantially nitrogen-free oxygen gas is supplied in the refining zone by top blowing oxygen with penetration of the slag layer, and by bottom blowing oxygen into the bath.

43. A process for continuous steel making in an elongated approximately horizontal reactor with a carbonaceous material and a flux comprising:

(a) providing an iron-rich feed more than half by weight of which is an iron rich material containing a fine iron ore which has been more than half by weight metallized to elemental iron by pre-reduction;

(b) introducing the iron-rich feed and carbonaceous material into a smelting zone of the elongated approximately horizontal reactor;

(c) continuously forming in the smelting zone a liquid bath of hot metal covered by a layer of slag;

(d) introducing by submerged injection into the bath in the smelting zone a carbonaceous material and a tonnage oxygen gas containing at least 95% by volume of oxygen;

(e) introducing a gas containing at least 95% by volume of oxygen into the smelting zone atmosphere without penetrating the slag layer;

(f) causing a moderate turbulence in the reactor bath and flowing the iron layer and the slag layer counter currently so that the iron flows from the smelting zone into a refining zone of the reactor and the slag flows from the refining one into the smelting zone;

(g) withdrawing the slag from the smelting zone;

(h) supplying substantially nitrogen-free oxygen gas by injection into the bath in the refining zone whereby steel is formed;

(i) withdrawing the steel from the refining zone; and (j) removing gaseous products formed in the smelting and refining zones from a discharge end of the smelting zone as an exhaust gas.

* * * * *